JOHN WALMSLEY.
Improvement in Harvester Rakes.
No. 123,752.  2 Sheets--Sheet 1.
Patented Feb. 13, 1872.
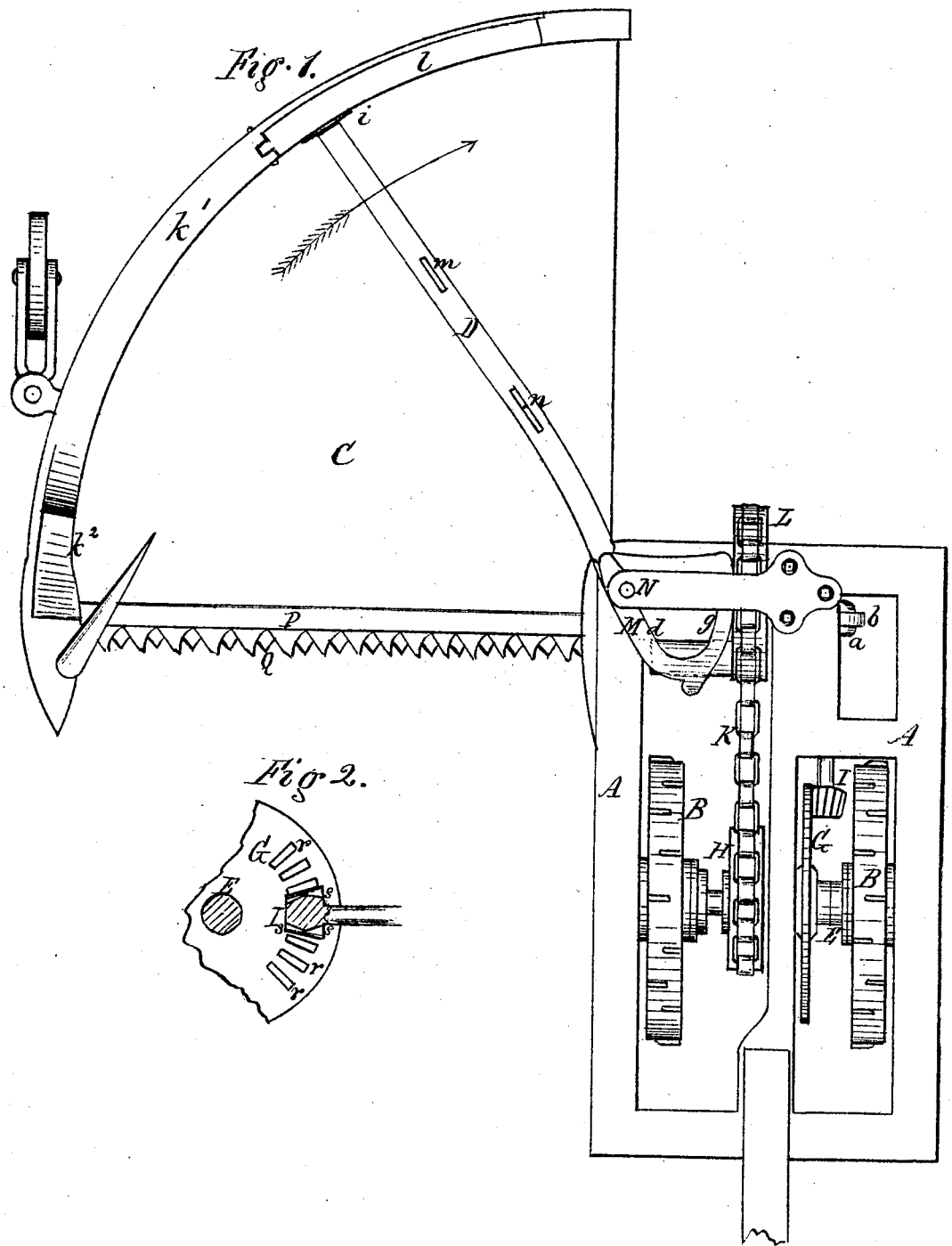
Witnesses.
Arch? Baine
R. F. Osgood
Inventor:
John Walmsley.
By Burke Fraser & Osgood,
attys.

JOHN WALMSLEY.
Improvement in Harvester Rakes.
No. 123,752. Patented Feb. 13, 1872.
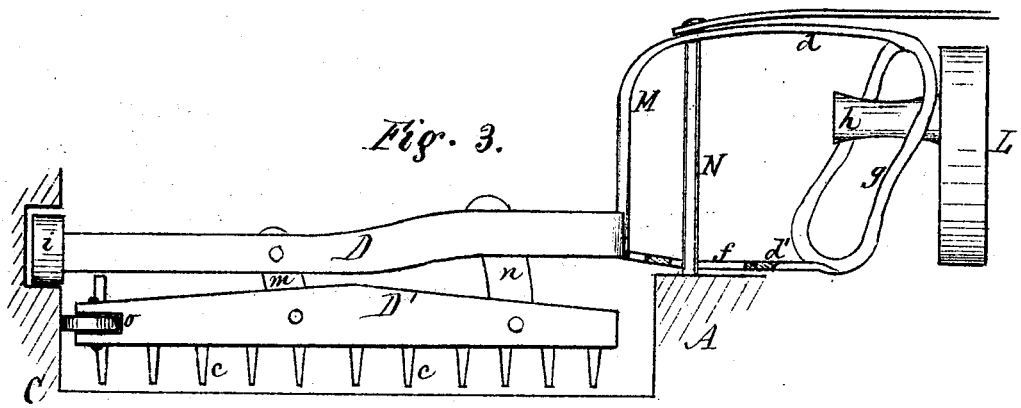
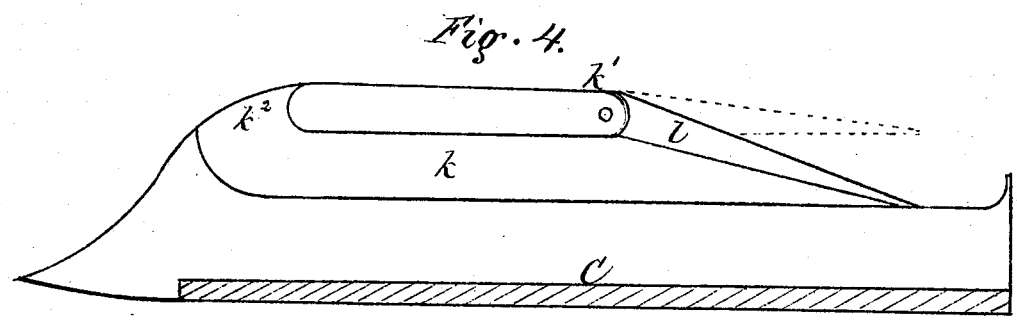
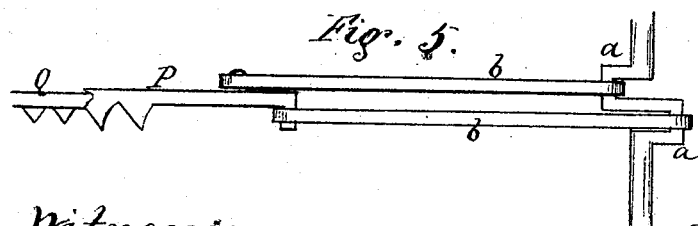
Witnesses.
Arch⁴ Baine
R. F. Osgood
Inventor.
John Walmsley,
By Burke Fraser & Osgood,
atty⁰

UNITED STATES PATENT OFFICE.

JOHN WALMSLEY, OF LONDON, CANADA.

IMPROVEMENT IN HARVESTER-RAKES.

Specification forming part of Letters Patent No. 123,752, dated February 13, 1872.

Specification describing certain Improvements in Harvesters, invented by JOHN WALMSLEY, of London, in the county of Middlesex and Province of Ontario, Dominion of Canada.

This invention consists in the construction and arrangement of the machine, as hereinafter described and claimed.

In the drawing, Figure 1 is a plan of my improved machine; Fig. 2, an elevation of the gearing; Fig. 3, an elevation of the rake and its connecting parts; Fig. 4, an interior elevation of the side of the platform; Fig. 5, a plan of the double cranks which give motion to the two sets of knives.

A represents the main frame, and B B the driving-wheels. C is the platform, which is in the form of a quadrant, and attached fast to the frame. D is the rake which sweeps over the platform. The wheels are ratcheted to the axle E, as usual, to allow the machine to back up without giving motion to the knives. On this axle is secured a gear-wheel, G, and sprocket-wheel H. The former gives motion to the knives by means of pinion I and double cranks $a\ a$, and pitmen $b\ b$; while the latter gives motion to the rake by means of the endless chain K and corresponding crank-wheel L. This arrangement is clearly shown in Fig. 1. The rake consists of two parts, D D'; the former serving as the shank or guide-head, while the latter is the rake proper, and carries the teeth $c\ c$, by which the grain is swept off. The shank D is attached to a bow, M, which swings around a vertical axis, N. The upper part $d$ of the bow has a close play around the axis, but the lower part $d'$ has an elongated slot, $f$, which allows the rake to rise and fall at its outer end to adapt itself to the track, as will presently be described. This is a special and important feature in my invention. The rear ends of the parts $d\ d'$ of the bow are united by an inclined and irregular-shaped loop, $g$, which embraces the crank-pin $h$ of the wheel L, which imparts a reciprocating motion by playing in the loop. The opposite end of shank D has a friction-roller, $i$, which runs back through a groove or track, $k$, to sweep the grain off, which groove is cut in the side of the platform, and returns to the front again by passing up over the top $k^1$ of the platform side. In order to complete this circuit I make a connecting-passage, $k^2$, at the front, through which the roller drops when it reaches that point, and a swinging latch, $l$, at the rear, which the roller lifts in passing under and travels above in passing over. This is clearly shown in Fig. 4. The rake is allowed to rise and fall in making this circuit by means of the slot $f$, before described. The head D' is attached to the shank by means of a fulcrum, $m$, which is pivoted at both ends, so as to allow a free rocking motion. It is stayed and guided by means of a segment, $n$, fast to the lower part, and playing in a slot of the upper part. At the outer end of the head is a guide-roller, $o$, which runs in contact with the inner side of the platform. This arrangement and method of hanging the head to the shank allows it to adapt itself to the platform and to light or heavy grain in passing over. The pitmen $b\ b$ of the double cranks $a\ a$ connect respectively with double knives P Q, which lie one set on top the other. These knives receive a reciprocating motion in opposite directions, and, by their rapid motion, cut the grain. If desired, the ordinary guards may be employed, or a single set of the knives may be used in connection with the guards. The gear G is simply a thin disk with the teeth formed in its face by cutting the openings $r\ r$ entirely through it, as shown in Fig. 2. The pinion I also has its teeth formed by cutting the spaces between the teeth beveling from the center forward and backward in a longitudinal direction, as shown at $s$ in the same figure. This method of cutting the teeth of the gears insures a ready discharge of the finely-cut grass or other extraneous matter which enters, and thus prevents clogging.

What I claim, and desire to secure by Letters Patent, is—

1. I claim in a harvester the bow M provided with the slot $f$ and loop $g$, when combined with the rake D D', made in two parts and connected together by the plates $m\ m$, as herein described.

In witness whereof I have hereunto signed my name in the presence of two subscribing witnesses.

JOHN WALMSLEY.

Witnesses:
R. F. OSGOOD,
ARCH'D BAINE.